(12) United States Patent
Ohki et al.

(10) Patent No.: US 10,353,580 B2
(45) Date of Patent: *Jul. 16, 2019

(54) INFORMATION PROCESSING APPARATUS, PROGRAM, AND OPERATION CONTROL METHOD

(71) Applicant: Sony Corporation, Tokyo (JP)

(72) Inventors: Yoshihito Ohki, Tokyo (JP); Yusuke Miyazawa, Tokyo (JP); Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,969

(22) Filed: Oct. 15, 2018

(65) Prior Publication Data

US 2019/0050144 A1    Feb. 14, 2019

Related U.S. Application Data

(63) Continuation of application No. 15/842,932, filed on Dec. 15, 2017, now Pat. No. 10,168,900, which is a (Continued)

(30) Foreign Application Priority Data

Aug. 20, 2010    (JP) .................. 2010-185072

(51) Int. Cl.
    *G06F 3/0488* (2013.01)
    *G06F 3/0484* (2013.01)
    *G06F 3/041* (2006.01)
    *G06F 3/0485* (2013.01)

(52) U.S. Cl.
    CPC ........ *G06F 3/04883* (2013.01); *G06F 3/0416* (2013.01); *G06F 3/0485* (2013.01);
    (Continued)

(58) Field of Classification Search
    None
    See application file for complete search history.

(56) References Cited

U.S. PATENT DOCUMENTS 6,072,474 A    6/2000 Morimura et al.
7,629,966 B2   12/2009 Anson
(Continued)

FOREIGN PATENT DOCUMENTS

CN    1808362       7/2006
JP    2008-192092   8/2008

OTHER PUBLICATIONS

Office Action dated Jul. 31, 2018 in Chinese Patent Application No. 201610682146.8.
(Continued)

*Primary Examiner* — Duane N Taylor, Jr.
(74) *Attorney, Agent, or Firm* — Xsensus LLP

(57) ABSTRACT

There is provided an information processing apparatus including: a detection unit for detecting pressure applied by user input performed on a touch screen; a determination unit for determining which of two or more input states the user input belongs to, in accordance with the pressure detected by the detection unit; and an operation control unit for enabling or disabling a limitation imposed on operation with a user interface displayed on the touch screen, in accordance with the state of the user input determined by the determination unit.

20 Claims, 15 Drawing Sheets

WITH LIMITATION

WITHOUT LIMITATION

Related U.S. Application Data continuation of application No. 15/647,757, filed on Jul. 12, 2017, now Pat. No. 9,870,146, which is a continuation of application No. 15/221,020, filed on Jul. 27, 2016, now Pat. No. 9,710,158, which is a continuation of application No. 13/190,854, filed on Jul. 26, 2011, now Pat. No. 9,547,436.

(52) U.S. Cl.
CPC ........ *G06F 3/0488* (2013.01); *G06F 3/04847* (2013.01); *H05K 999/99* (2013.01); *G06F 2203/04105* (2013.01)

(56) References Cited

U.S. PATENT DOCUMENTS

| | | | |
|---|---|---|---|
| 7,969,412 B2* | 6/2011 | Nagiyama | G06F 3/016 345/156 |
| 8,378,898 B2 | 2/2013 | Bells | |
| 2006/0132456 A1 | 6/2006 | Anson | |
| 2006/0197753 A1 | 9/2006 | Hotelling | |
| 2006/0284858 A1* | 12/2006 | Rekimoto | G06F 3/033 345/173 |
| 2008/0088602 A1 | 4/2008 | Hotelling | |
| 2009/0140871 A1 | 6/2009 | Titus | |
| 2009/0179867 A1* | 7/2009 | Shim | G06F 9/453 345/173 |
| 2011/0018695 A1 | 1/2011 | Bells | |

OTHER PUBLICATIONS

Extended European Search Report dated Feb. 21, 2018 in European Patent Application No. 18153066.8.

* cited by examiner

INFORMATION PROCESSING APPARATUS, PROGRAM, AND OPERATION CONTROL METHOD

CROSS-REFERENCE TO RELATED APPLICATIONS

This application is a continuation of and is based upon and claims the benefit of priority under 35 U.S.C. § 120 from U.S. patent application Ser. No. 15/842,932, filed Dec. 15, 2017, which is a continuation of U.S. patent application Ser. No. 15/647,757, filed Jul. 12, 2017, which is a continuation of U.S. patent application Ser. No. 15/221,020, filed Jul. 27, 2016 (now U.S. Pat. No. 9,710,158, issued Jul. 18, 2017), which is a continuation of Ser. No. 13/190,854, filed Jul. 26, 2011 (now U.S. Pat. No. 9,547,436, issued Jan. 17, 2017), and claims the benefit of priority under 35 U.S.C. § 119 of Japanese Patent Application No. 2010-185072, filed Aug. 20, 2010; the entire contents of each of which are incorporated herein by reference.

BACKGROUND

The present disclosure relates to an information processing apparatus, a program, and an operation control method.

In recent years, various devices having touch screens are widely used. A touch screen is also referred to as a touch panel, which achieves two functionalities, i.e., display and input, on one screen. One advantage of touch screens is intuitive operationality. Unlike a mouse, a keyboard, a keypad, or other pointing devices, a user who uses the touch screen can directly touch a manipulation target displayed on the screen, and can manipulate the manipulation target.

However, one drawback of the touch screen is a difficulty in expanding user input. For example, when a mouse is used, user input may be expanded by adding input means such as buttons and wheels to the mouse. When a keyboard or a keypad is used, there may be as many different types of user inputs as at least the number of keys. However, when the touch screen is used, manipulation object is a simple tool such as a finger or a stylus. Accordingly, in many cases, it is more or less difficult to provide an additional component to the manipulation object.

In order to solve such issues, Japanese Patent Application Laid-Open No. 2008-192092 suggests a technique for associating and registering patterns of touch pressure waveforms or pressure distributions detected by a touch screen with various processings, and loading registered processing in accordance with an input pattern.

SUMMARY

However, some user inputs are accompanied with another user input. And, while a main user input is performed on a touch screen, it is not easy for a user to reproduce a particular pressure waveform or pressure distribution for additional user input registered in advance, as described in the technique of Japanese Patent Application Laid-Open No. 2008-192092.

One example is that, when a straight line is drawn by dragging a mouse in some graphic editor, the drawing direction can be limited to a direction of an integral multiple of 90 degrees (or 45 degrees) by dragging the mouse with pressing down a particular key (such as a SHIFT key or a CTRL key). In this case, the accompanying additional user input, i.e., pressing down of the particular key, is performed while the main user input, i.e., dragging of the mouse, is performed. When a touch screen is used, it is possible to draw a straight line by dragging. However, it is difficult to reproduce a particular pressure waveform or pressure distribution while a straight line is drawn by dragging. When a user needs to perform input operation outside of the touch screen such as pressing down a particular key while drawing a straight line, the intuitive operationality unique to the touch screen is spoiled, and the advantage of using the touch screen is lost. This kind of additional user input is often used to change a setting of limitation of user interface operated by a main user input as explained in the above example of a graphic editor.

In light of the foregoing, it is desirable to provide a novel and improved information processing apparatus, program, and operation control method, capable of easily changing, on a touch screen, a setting of limitation imposed on a user interface.

According to an embodiment of the present disclosure, there is provided an information processing apparatus including: a detection unit for detecting pressure applied by user input performed on a touch screen; a determination unit for determining which of two or more input states the user input belongs to, in accordance with the pressure detected by the detection unit; and an operation control unit for enabling or disabling a limitation imposed on operation with a user interface displayed on the touch screen, in accordance with the state of the user input determined by the determination unit.

The determination unit may determine which of two or more input states the user input belongs to by comparing the pressure with a threshold value.

The information processing apparatus may further include: a display unit for displaying, on the touch screen, the state of the user input determined by the determination unit.

The user interface may be a graphical user interface with which a user specifies a parameter.

The limitation may be a limitation imposed on a granularity of a value of the parameter that can be specified.

The parameter may be a parameter for an amount of scroll of a content displayed on the touch screen.

The parameter may be a parameter for a numerical value.

The parameter may be a parameter for a selection range of a content displayed on the touch screen.

The parameter may be a parameter for a position or a size of an object displayed on the touch screen.

When the pressure is determined to be more than the threshold value, the determination unit may determine that the user input belongs to a first input state, and thereafter, until a predetermined condition is satisfied, the determination unit may determine that a subsequent user input also belongs to the first input state.

The predetermined condition may include releasing of a manipulation object from the touch screen.

The predetermined condition may include elapse of a certain period of time.

The predetermined condition may include a condition that the pressure once becomes less than the threshold value and thereafter becomes more than the threshold value.

According to an embodiment of the present disclosure, there is provided a program for causing a computer that controls an information processing apparatus to function as: a detection unit for detecting pressure applied by user input performed on a touch screen; a determination unit for determining which of two or more input states the user input belongs to, in accordance with the pressure detected by the detection unit; and an operation control unit for enabling or disabling a limitation imposed on operation with a user interface displayed on the touch screen, in accordance with the state of the user input determined by the determination unit.

The determination unit may determine which of two or more input states the user input belongs to by comparing the pressure with a threshold value.

The program may cause the computer to further function as a display unit for displaying, on the touch screen, the state of the user input determined by the determination unit.

The user interface may be a graphical user interface with which a user specifies a parameter.

The limitation may be a limitation imposed on a granularity of a value of the parameter that can be specified.

When the pressure is determined to be more than the threshold value, the determination unit may determine that the user input belongs to a first input state, and thereafter, until a predetermined condition is satisfied, the determination unit may determine that a subsequent user input also belongs to the first input state.

According to an embodiment of the present disclosure, there is provided an operation control method including: detecting pressure applied by user input performed on a touch screen; determining which of two or more input states the user input belongs to, in accordance with the detected pressure; and enabling or disabling a limitation imposed on operation with a user interface displayed on the touch screen, in accordance with the determined state of the user input.

As described above, according to the information processing apparatus, the program, and the operation control method according to the present disclosure, a setting of limitation imposed on a user interface can be easily changed on a touch screen.

DETAILED DESCRIPTION OF THE EMBODIMENTS

Figure 1:
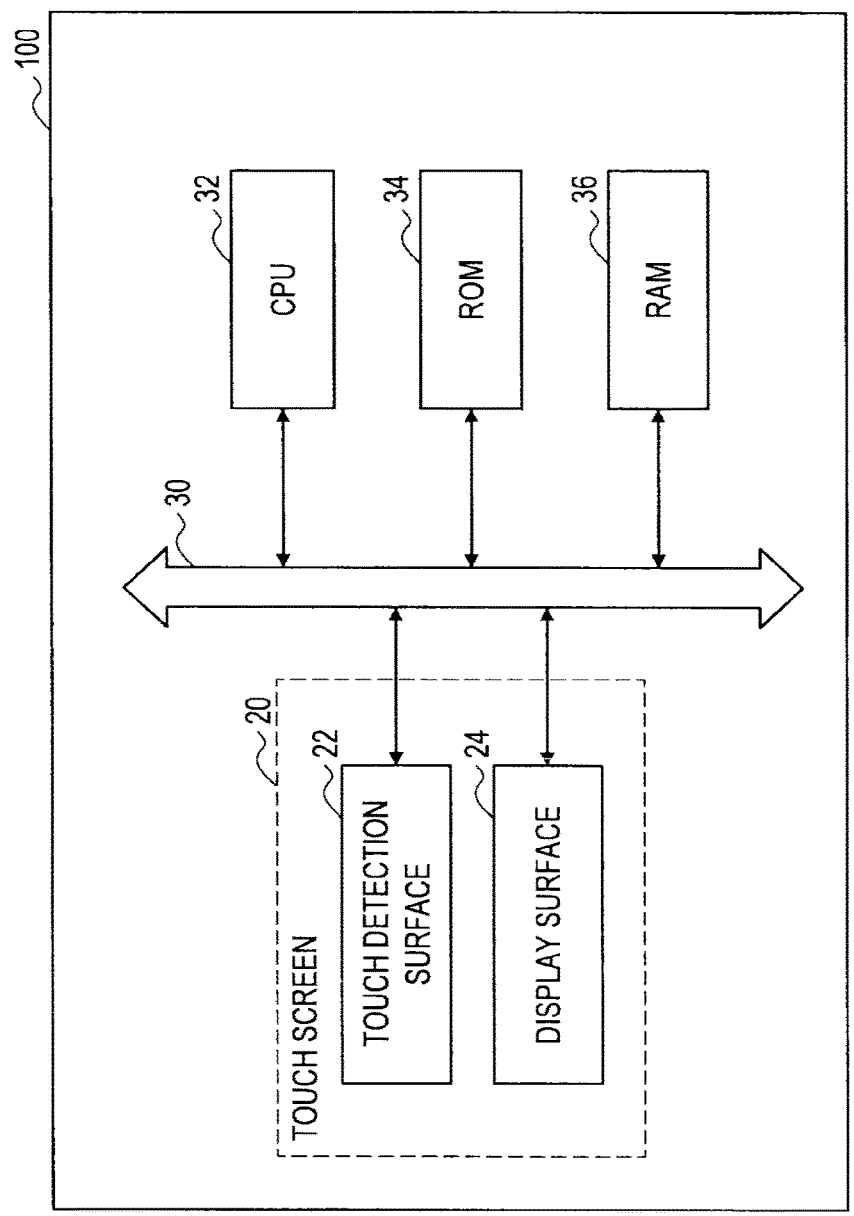
FIG. 1 is a block diagram illustrating an example of hardware configuration of an information processing apparatus according to an embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, "DETAILED DESCRIPTION OF THE EMBODIMENTS" will be described in detail in the order listed below.

1. Exemplary configuration of apparatus
2. Examples of input state according to pressure
3. Examples of user interface
4. Examples of display of input state
5. Examples of flow of processings
6. Conclusion

1. EXEMPLARY CONFIGURATION OF APPARATUS

An information processing apparatus explained in this specification is typically an apparatus having a touch screen. For example, the information processing apparatus may be a PC (Personal Computer), a smart phone, a PDA (Personal Digital Assistant), a music player, a game terminal or a digital household appliance. Alternatively, the information processing apparatus may be a peripheral device connected to these devices.

(1) Hardware Configuration

FIG. 1 is a block diagram illustrating an example of hardware configuration of an information processing apparatus 100 according to the present embodiment. As shown in FIG. 1, the information processing apparatus 100 includes a touch screen 20, a bus 30, a CPU (Central Processing Unit) 32, a ROM (Read Only Memory) 34, and a RAM (Random Access Memory) 36.

The touch screen 20 includes a touch detection surface 22 and a display surface 24. The touch detection surface 22 detects touch operation by a user on the touch screen 20, and generates an electric signal representing pressure of the touch and the touched position. For example, the touch detection surface 22 is formed according to any touch detection method such as a resistive film method, a surface acoustic wave method, or an electrostatic method. The display surface 24 displays an output image given by the information processing apparatus 100. For example, the display screen 24 is implemented using liquid crystal, organic EL (Organic Light-Emitting Diode: OLED), or CRT (Cathode Ray Tube).

The bus 30 connects the touch detection surface 22, the display surface 24, the CPU 32, the ROM 34 and the RAM 36 with each other.

The CPU 32 controls overall operations in the information processing apparatus 100. The ROM 34 stores data and programs constituting software executed by the CPU 32. The RAM 36 temporarily stores the data and the programs during execution of the processings by the CPU 32.

Although explanation is omitted here for the sake of brevity of explanation, the information processing apparatus 100 may include constituent elements other than those depicted in FIG. 1.

(2) Logical Configuration

Figure 2:
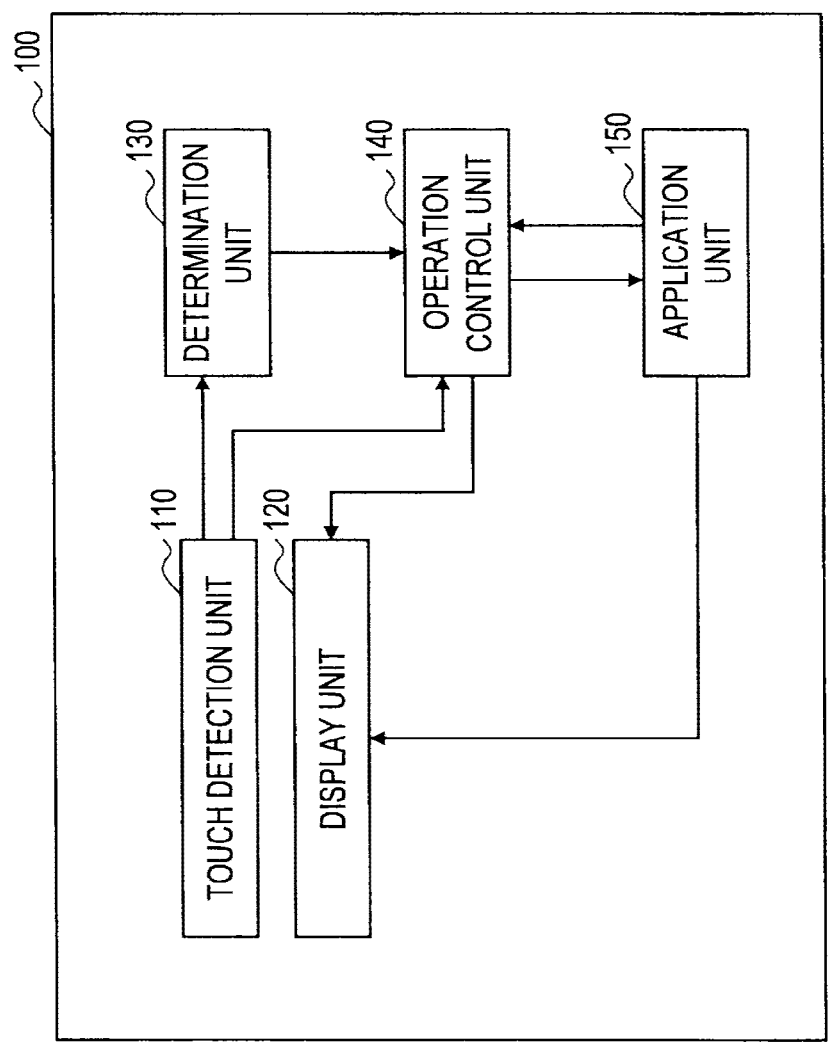
FIG. 2 is a block diagram illustrating an example of logical configuration of an information processing apparatus according to an embodiment.

FIG. 2 is a block diagram illustrating an example of logical configuration of the information processing apparatus 100 according to the present embodiment. As shown in FIG. 2, the information processing apparatus 100 includes a touch detection unit 110, a display unit 120, a determination unit 130, an operation control unit 140, and an application unit 150.

The touch detection unit 110 detects a user input as a touch operation on the touch screen 20. Then, the touch detection unit 110 outputs information including the touched position and the pressure value, i.e., attributes of the detected user input, to the determination unit 130 and the operation control unit 140 in the order of time.

The display unit 120 uses the display surface 24 of the touch screen 20 to display the output image provided by the information processing apparatus 100. For example, the output image displayed by the display unit 120 may include an application screen generated by the application unit 150 explained later. Further, the output image displayed by the display unit 120 may include a screen of an operating system (not shown) of the information processing apparatus 100. Still further, these output image may include an image of a graphical user interface (GUI) controlled by the operation control unit 140.

The determination unit 130 determines which of two or more input states a user input belongs to, in accordance with pressure detected by the touch detection unit 110.

In this specification, examples of two or more input states include an enabled state and a disabled state of limitation imposed on operation with user interfaces. For example, limitation of drawing direction for drawing a straight line by drag operation is one of limitations imposed on operation with user interfaces. In this example, in the enabled state of limitation, for example, the drawing direction can be limited to a direction of an integral multiple of 90 degrees (i.e., four directions including upward, downward, left, and right). On the other hand, in the disabled state of limitation, any drawing direction can be specified. The enabled state of limitation may include a plurality of states. For example, there may be a third input state in which the drawing direction is limited to a direction of an integral multiple of 45 degrees (i.e., eight directions including upward, downward, left, right, upper right, lower right, upper left, and lower left).

For example, the determination unit 130 compares the latest pressure (i.e., currently input pressure) with a threshold value set in advance, whereby the determination unit 130 may determine which of two or more input states the user input belongs to. For example, when the pressure is determined to be more than the threshold value, the determination unit 130 may determine that the user input belongs to the first input state. Thereafter, until a predetermined condition is satisfied, the determination unit 130 may determine that subsequent user inputs also belong to the first input state. In this specification, the latter method is referred to as "lock" of input state. A specific example of input state determination processing with this kind of determination unit 130 will be further detailed below.

The operation control unit 140 enables or disables limitation imposed on operation with a user interface displayed on the touch screen 20 in accordance with an input state determined by the determination unit 130. For example, when the latest pressure is equal to or less than the threshold value, this state is referred to as the first input state, and when the latest pressure is more than the threshold value, this state is referred to as the second input state. That is, it is assumed that the first input state is defined as a state in which limitation is enabled, and the second input state is defined as a state in which limitation is disabled. Under these presumptions, when user input is given with a low pressure (equal to or less than the threshold value), the operation control unit 140 controls operation with user interface with limitation. On the other hand, when user input is given with a high pressure (more than the threshold value), the operation control unit 140 controls operation with user interface upon deactivating the limitation. A specific example of user interface whose operation is controlled by the operation control unit 140 will be further detailed below.

The application unit 150 provides application functions to the user of the information processing apparatus 100. For example, the application unit 150 includes one or more of a Web browser, a digital album, a document editor, an email client, a content player, and a game application. For example, the user can use these application functions via a GUI controlled by the operation control unit 140 according to pressure.

2. EXAMPLES OF INPUT STATE ACCORDING TO PRESSURE

Subsequently, a specific example of input state determination processing with the determination unit 130 according to the present embodiment will be explained with reference to FIGS. 3 to 6. FIGS. 3 to 6 are explanatory diagrams each illustrating an example of input state determination processing performed with the determination unit 130. The graph in the upper part of each figure represents a pressure value obtained by detection with the touch detection unit 110 along a temporal axis. On the other hand, determination results of input states determined by the determination unit 130 in accordance with the pressure values detected by the touch detection unit 110 are shown under each graph.

(1) First Example

Figure 3:
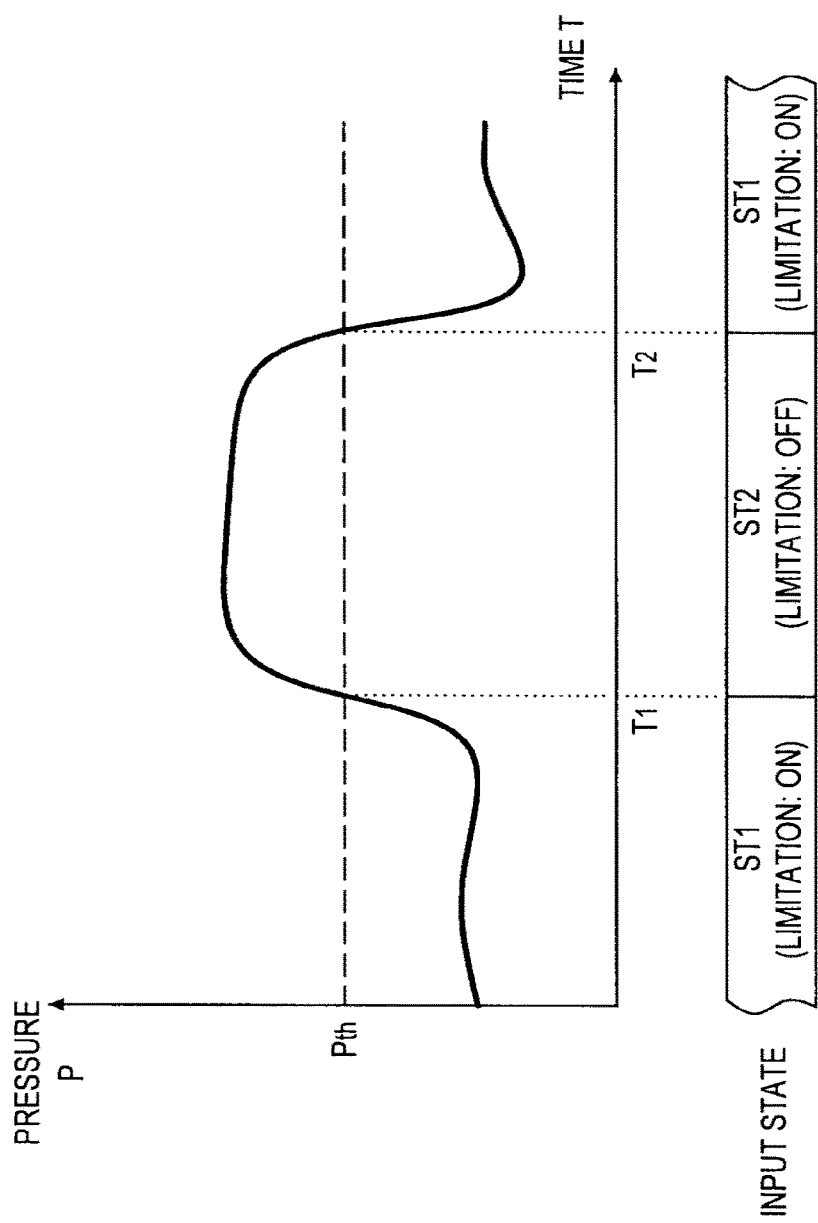
FIG. 3 is an explanatory diagram illustrating a first example of input state determination processing according to an embodiment.

In the first example (FIG. 3) of the input state determination processing, the determination unit 130 compares a latest pressure value P with a threshold value $P_{th}$ set in advance, thereby determining which of input states ST1 and ST2 a user input belongs to. As shown in FIG. 3, in the period when a time T is equal to or less than $T_1$, the pressure value P is equal to or less than the threshold value $P_{th}$. Accordingly, the determination unit 130 determines that the user input during this period belongs to the input state ST1. Subsequently, in the period when the time T is more than $T_1$ but is equal to or less than $T_2$, the pressure value P is more than the threshold value $P_{th}$. Accordingly, the determination unit 130 determines that the user input during this period belongs to the input state ST2. Further, in the period when the time T is more than $T_2$, the pressure value P is equal to or less than the threshold value $P_{th}$ again. The determination unit 130 determines that the user input during this period belongs to the input state ST1. As a result, for example, in the period when the time T is equal to or less than $T_1$ and the period when the time T is more than $T_2$, the limitation imposed on the operation with user interface can be enabled. In the period when the time T is more than $T_1$ but is equal to or less than $T_2$, the limitation can be disabled (or vice versa).

In this case, the threshold value $P_{th}$ may be set in a fixed manner, or may be dynamically changed. For example, a different threshold value $P_{th}$ may be set in advance for each user who logs into the information processing apparatus 100. Alternatively, the threshold value $P_{th}$ may be dynamically determined on the basis of an average value of sampled pressures applied by users.

(2) Second Example

Figure 4:
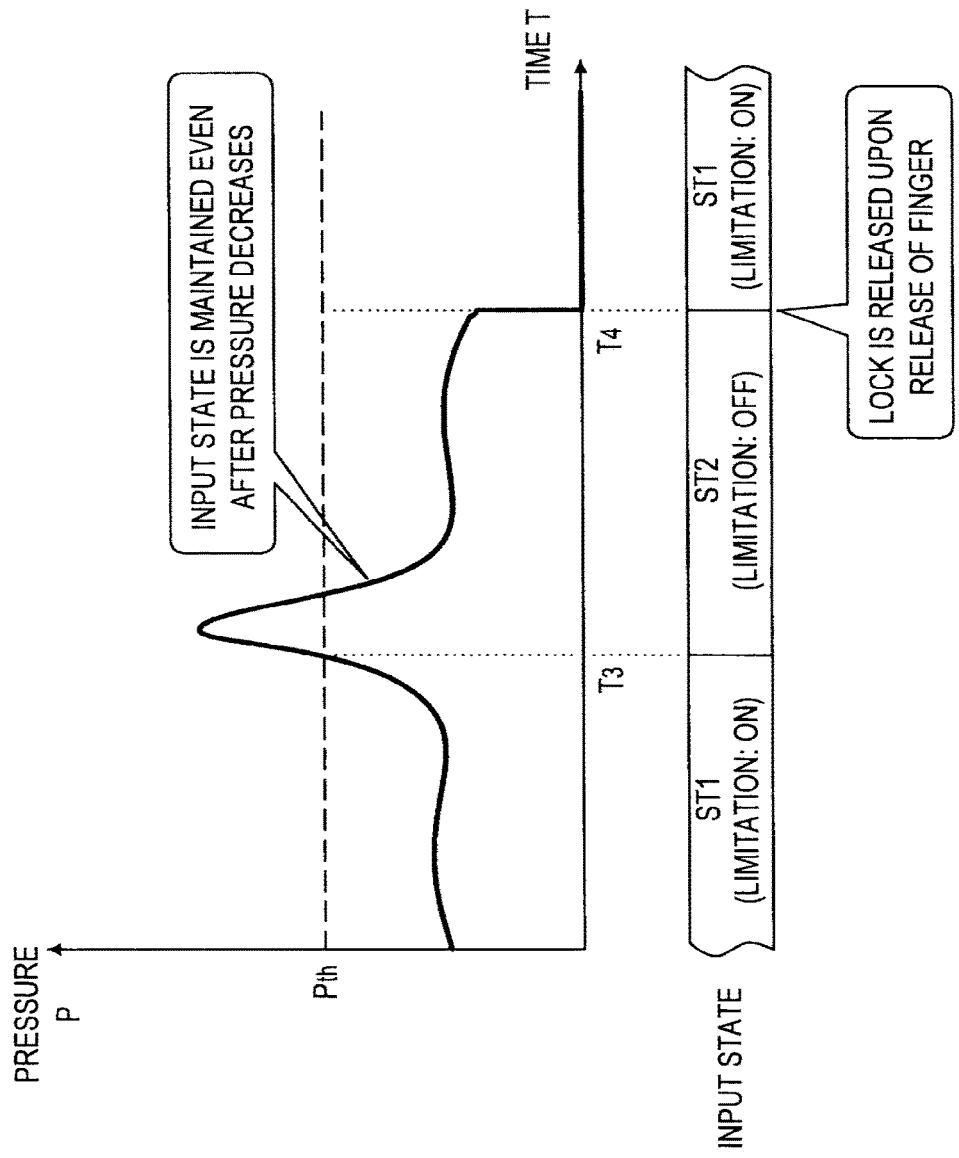
FIG. 4 is an explanatory diagram illustrating a second example of input state determination processing according to an embodiment.
Figure 5:
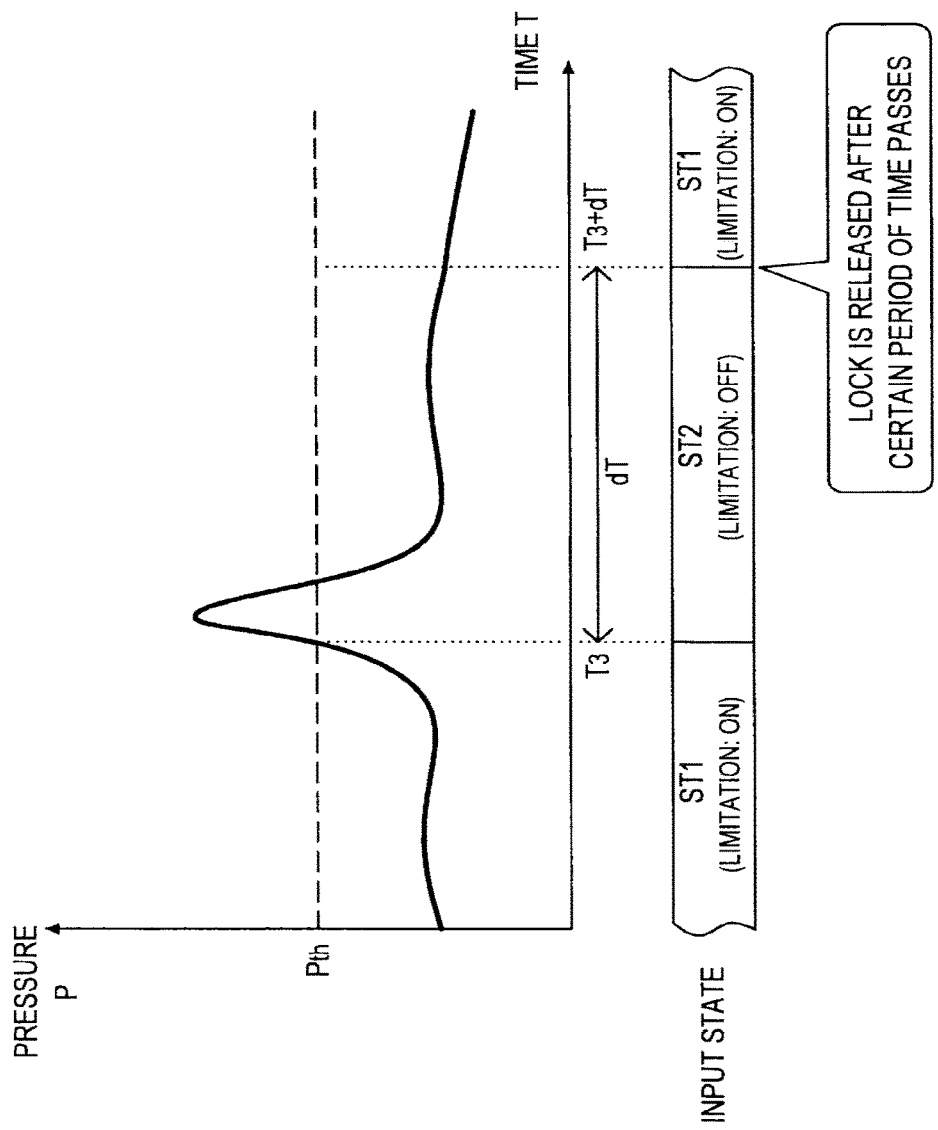
FIG. 5 is an explanatory diagram illustrating a third example of input state determination processing according to an embodiment.
Figure 6:
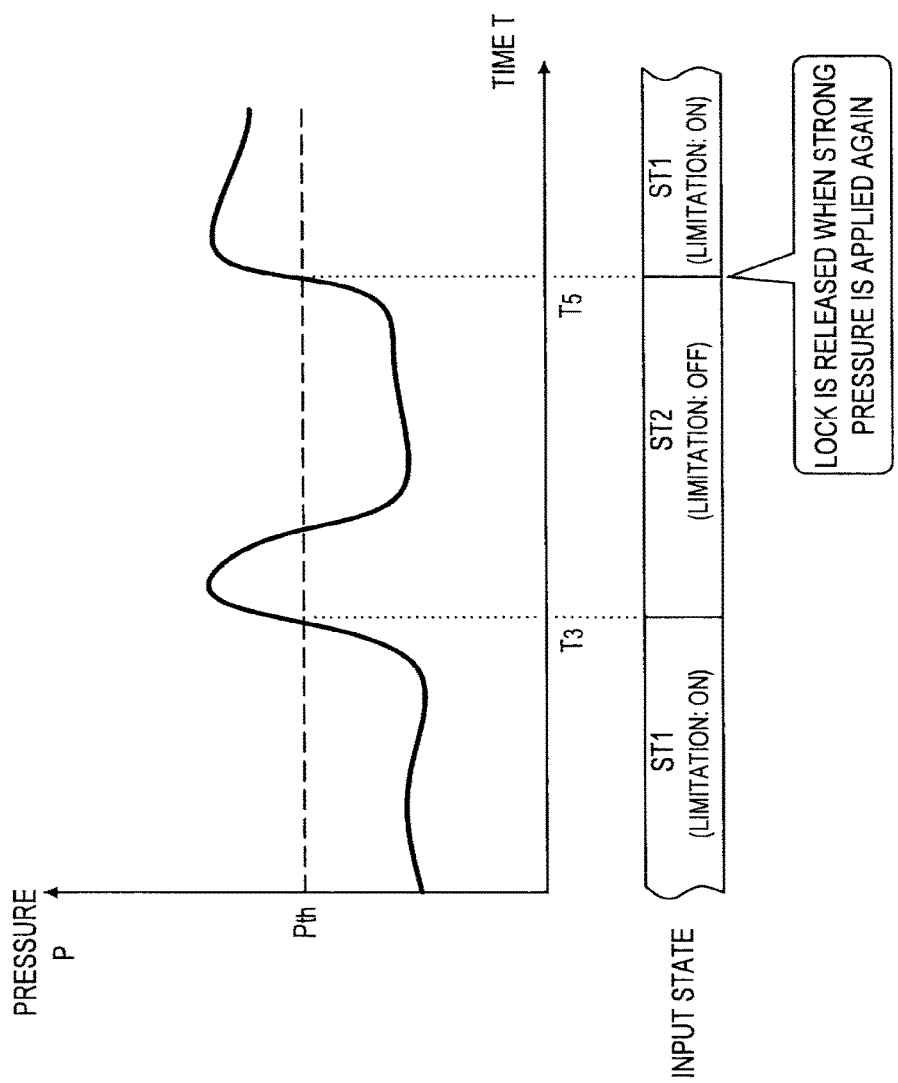
FIG. 6 is an explanatory diagram illustrating a fourth example of input state determination processing according to an embodiment.

FIGS. 4 to 6 are explanatory diagrams each illustrating an example of locking of input state. In the second example of input state determination processing, when the pressure value P is determined to be more than the threshold value $P_{th}$, the determination unit 130 determines that the input state is the input state ST2. Thereafter, until a manipulation object is released from the touch screen 20, the determination unit 130 determines that subsequent user inputs belong to the input state ST2. As shown in FIG. 4, in the period when a time T is equal to or less than $T_3$, the pressure value P is equal to or less than the threshold value $P_{th}$. Accordingly, the determination unit 130 determines that the user input during this period belongs to the input state ST1. Thereafter, when the time T is equal to the time $T_3$, the pressure value P attains a value more than the threshold value $P_{th}$. Accordingly, in a period from this point of time to when a user releases a finger or other manipulation object from the touch screen 20, the determination unit 130 determines that, even if the pressure value P is less than the threshold value $P_{th}$, the user input during this period belongs to the input state ST2. As shown in FIG. 4, when the time T is equal to $T_4$, the pressure value P becomes zero, at which it is recognized that the user releases the manipulation object from the touch screen 20. Therefore, the user input in the period when the time T is more than $T_4$ is determined to belong to the input state ST1 again.

Since the input state is locked as described above, the user can operate the user interface in such a manner that the limitation enabled by the existing setting is disabled (or the limitation disabled by the existing setting is enabled) without forcing the user to constantly operate the touch screen 20 with a high pressure during drag operation.

(3) Third Example

In the third example, when the pressure value P is determined to be more than the threshold value $P_{th}$, the determination unit 130 determines that the input state is the input state ST2. Thereafter, until a predetermined period of time passes, the determination unit 130 determines that subsequent user inputs belong to the input state ST2. As shown in FIG. 5, in the period when the time T is equal to or less than $T_3$, the pressure value P is equal to or less than the threshold value $P_{th}$. Accordingly, the determination unit 130 determines that the user input during this period belongs to the input state ST1. Thereafter, when the time T is equal to the time $T_3$, the pressure value P attains a value more than the threshold value $P_{th}$. Accordingly, in a period from this point of time to when a certain period of time dT passes, the determination unit 130 determines that, even if the pressure value P is less than the threshold value $P_{th}$, the user input during this period belongs to the input state ST2. As shown in FIG. 5, at a time $T=T_3+dT$, the input state determined by the determination unit 130 returns from the input state ST2 to the input state ST1.

(4) Fourth Example

In the fourth example, when the pressure value P is determined to be more than the threshold value $P_{th}$, the determination unit 130 determines that the input state is the input state ST2. Thereafter, from when the pressure value P becomes less than the threshold value $P_{th}$ and to when the pressure value P becomes more than the threshold value $P_{th}$ again, the determination unit 130 determines that subsequent user inputs belong to the input state ST2. As shown in FIG. 6, in the period when the time T is equal to or less than $T_3$, the pressure value P is equal to or less than the threshold value $P_{th}$. Accordingly, the determination unit 130 determines that the user input during this period belongs to the input state ST1. Thereafter, when the time T is equal to the time $T_3$, the pressure value P attains a value more than the threshold value $P_{th}$. Accordingly, in a period after this point of time, the determination unit 130 determines that, even if the pressure value P is less than the threshold value $P_{th}$, the user input during this period belongs to the input state ST2. As shown in FIG. 6, the pressure value P temporarily decreases to a value less than the threshold value $P_{th}$ once, and then when the time T is equal to $T_5$, the pressure value P attains a value more than the threshold value $P_{th}$ again. Therefore, the user input in the period when the time T is more than $T_5$ is determined to belong to the input state ST1 again.

According to the lock release method shown in FIG. 5 or 6, a user can easily switch enabled/disabled state of limitation imposed on operation with user interface in a series of operations without once releasing the manipulation object from the touch screen 20.

3. EXAMPLES OF USER INTERFACE

Subsequently, six examples of GUIs controlled by the operation control unit 140 according to the present embodiment will be explained with reference to FIGS. 7 to 12.

(1) First Example

Figure 7:
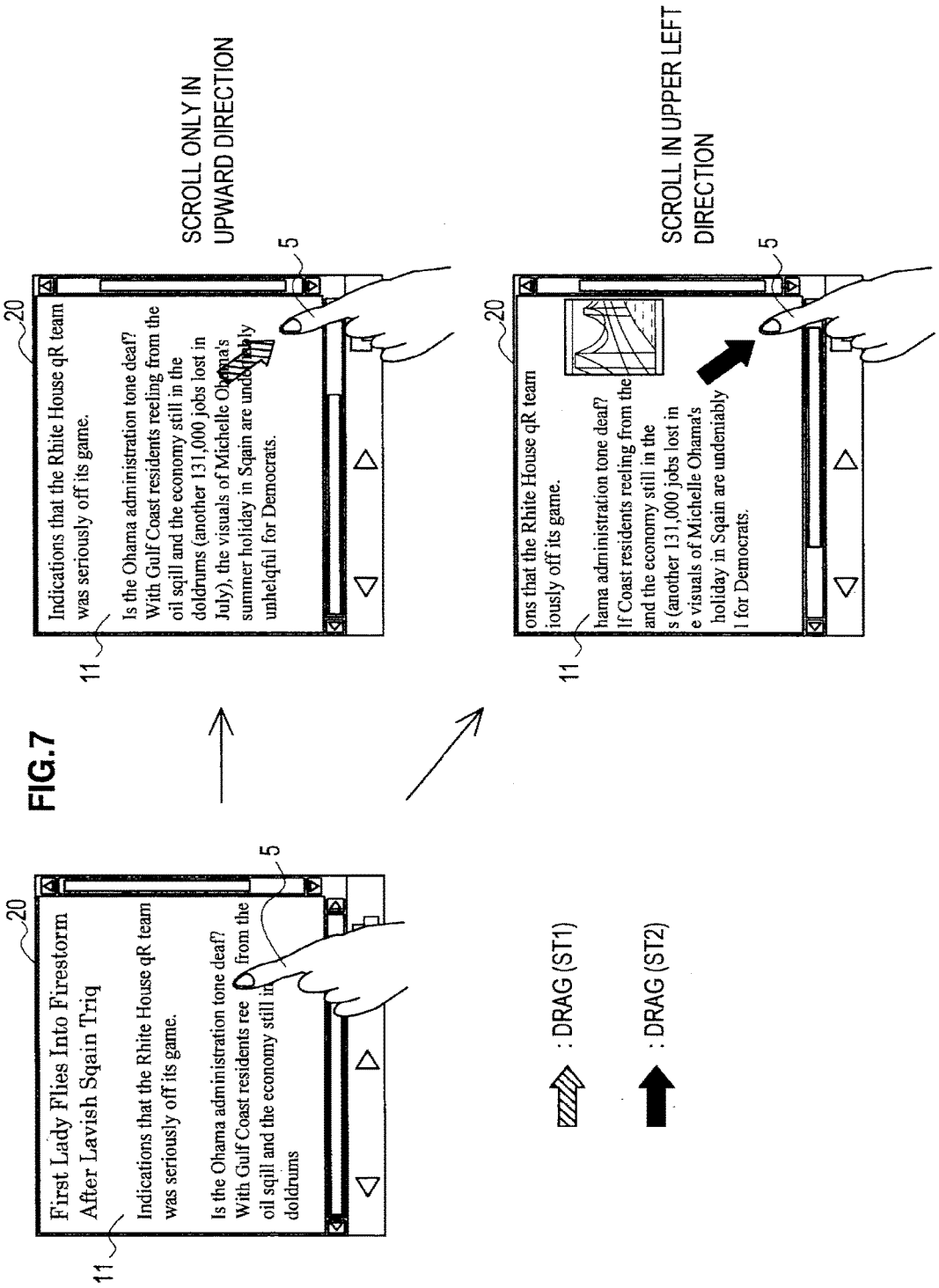
FIG. 7 is an explanatory diagram illustrating a first example of GUI according to an embodiment.

The first example shown in FIG. 7 is an example of GUI with which a user specifies an amount of scroll in a screen. The limitation of the GUI in the first example is a limitation for limiting scroll direction to one of a plurality of directions.

As shown in the left part of FIG. 7, a Web page 11 showing news articles is displayed on the touch screen 20. The Web page 11 can be scrolled in the vertical and horizontal directions. In this case, when a user drags a finger 5 on the touch screen 20, the Web page 11 scrolls in the dragged direction. However, the scroll direction of the Web page 11 is limited to only the vertical direction in the input state ST1. On the other hand, the scroll direction of the Web page 11 is not limited in the input state ST2. In the input state ST2, it may also be possible to scroll in the horizontal direction.

As shown in the upper right of FIG. 7, the user drags the finger 5 to a lower right corner on the touch screen 20 in the input state ST1, so that the Web page 11 is scrolled upward (not scrolled in the upper left direction). In other words, the above limitation is enabled. On the other hand, as shown in the lower right of FIG. 7, the user drags the finger 5 to a lower right corner on the touch screen 20 in the input state ST2, so that the Web page 11 is scrolled in the upper left direction.

(2) Second Example

Figure 8:
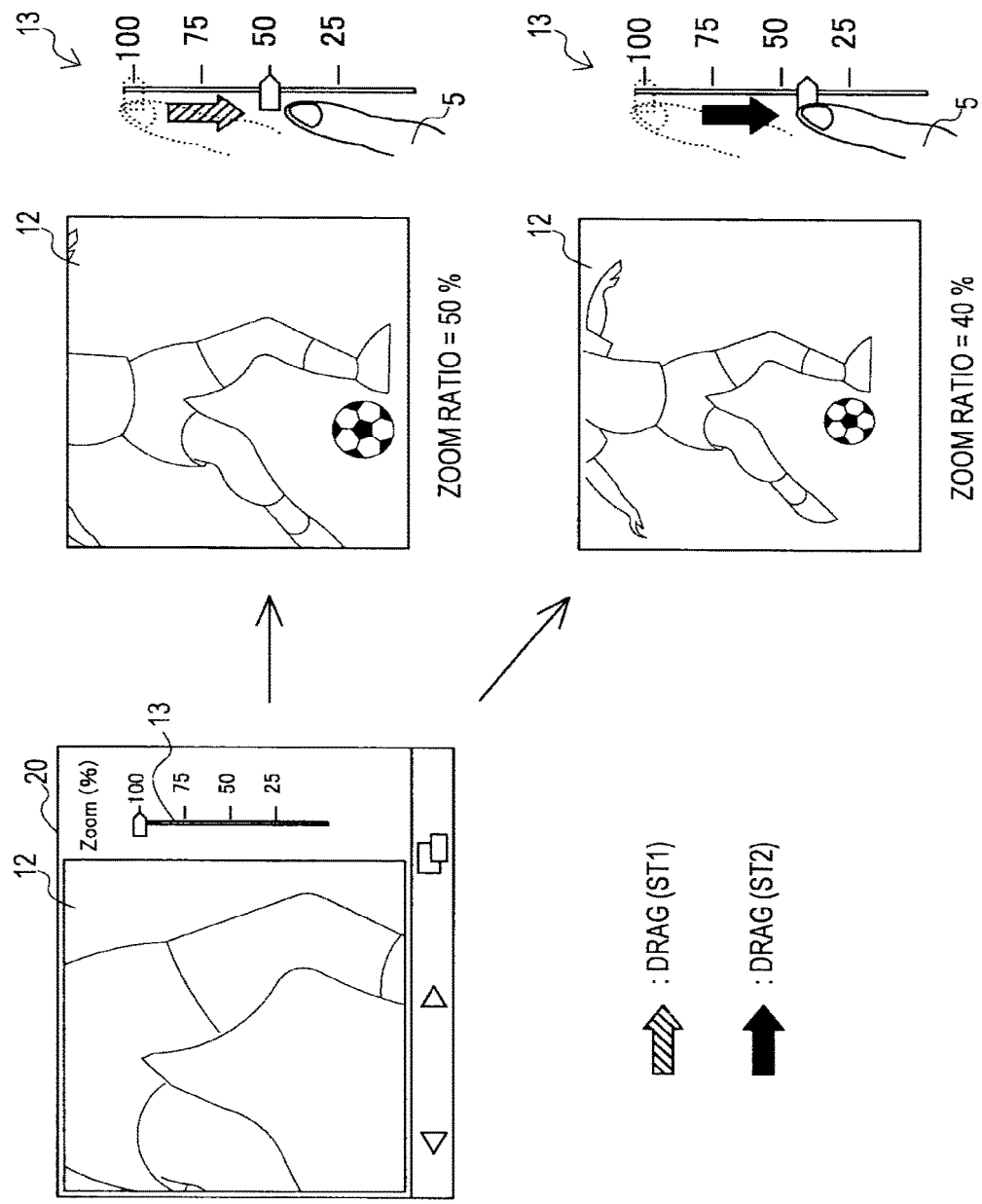
FIG. 8 is an explanatory diagram illustrating a second example of GUI according to an embodiment.

The second example shown in FIG. 8 is an example of GUI with which a user specifies a parameter value in a predetermined range. The limitation of the GUI in the second example is a limitation for limiting the number of specifiable parameter values to a limited number of candidate values.

As shown in the left of FIG. 8, an image 12 and a slider 13 are displayed on the touch screen 20. The slider 13 is a GUI for specifying a zoom ratio of the image 12. When a user drags a knob of the slider 13, the zoom ratio of the image 12 is changed according to the position of the dragged knob. However, in the input state ST1, the zoom ratio can be specified as only four types of values, i.e., 100%, 75%, 50% or 25%. On the other hand, in the input state ST2, the zoom ratio can be specified as any value ranging from 1% to 100%.

As shown in the upper right of FIG. 8, the user drags the knob of the slider 13 in the input state ST1, so that the image 12 is displayed with a zoom ratio of 50%. On the other hand, as shown in the lower right of FIG. 8, the user drags the knob of the slider 13 to the same position in the input state ST2, so that the image 12 is displayed with a zoom ratio of 40%.

(3) Third Example

Figure 9:
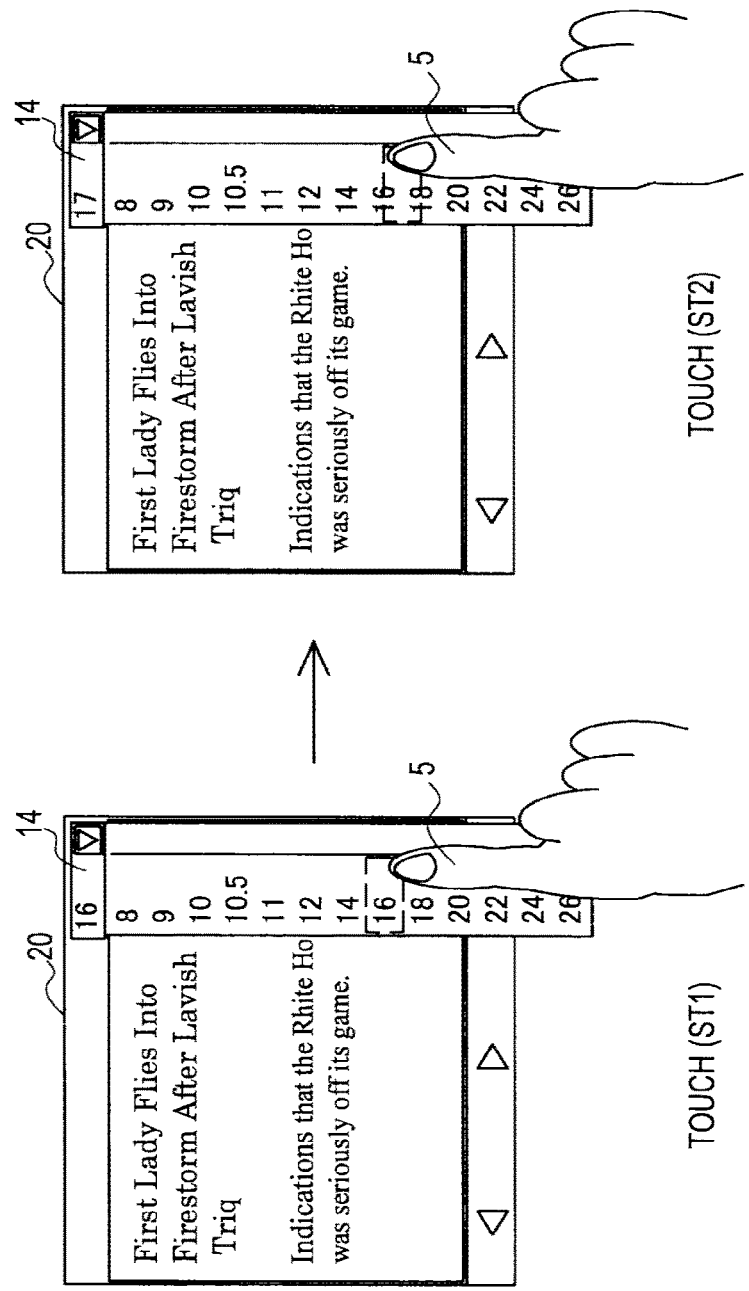
FIG. 9 is an explanatory diagram illustrating a third example of GUI according to an embodiment.

The third example shown in FIG. 9 is also an example of GUI with which a user specifies a parameter value. Like the second example, the limitation of the GUI in the third example is a limitation for limiting the number of specifiable parameter values to a limited number of candidate values.

In FIG. 9, a drop-down list 14 is displayed on the touch screen 20 to allow a user to specify a font size of text. The user can specify a font size corresponding to a touched position by touching a position in a list of the drop-down list 14. However, in the input state ST1, the values that can be specified are only those shown in the list. On the other hand, in the input state ST2, values not shown in the list can also be specified according to a touched position.

As shown in the left of FIG. 9, the user touches a position in a list of the drop-down list 14 in the input state ST1, whereby font size 16 pt is selected. On the other hand, as shown in the right of FIG. 9, the user touches the same position in the list of the drop-down list 14 (the position between 16 and 18 in the list) in the input state ST2, whereby font size 17 pt is selected. For example, the value of the font size in the input state ST2 is determined by interpolating the value of the font size, on the basis of the touched position and a position of a label (for example, central position) of a font size shown in the list.

(4) Fourth Example

Figure 10:
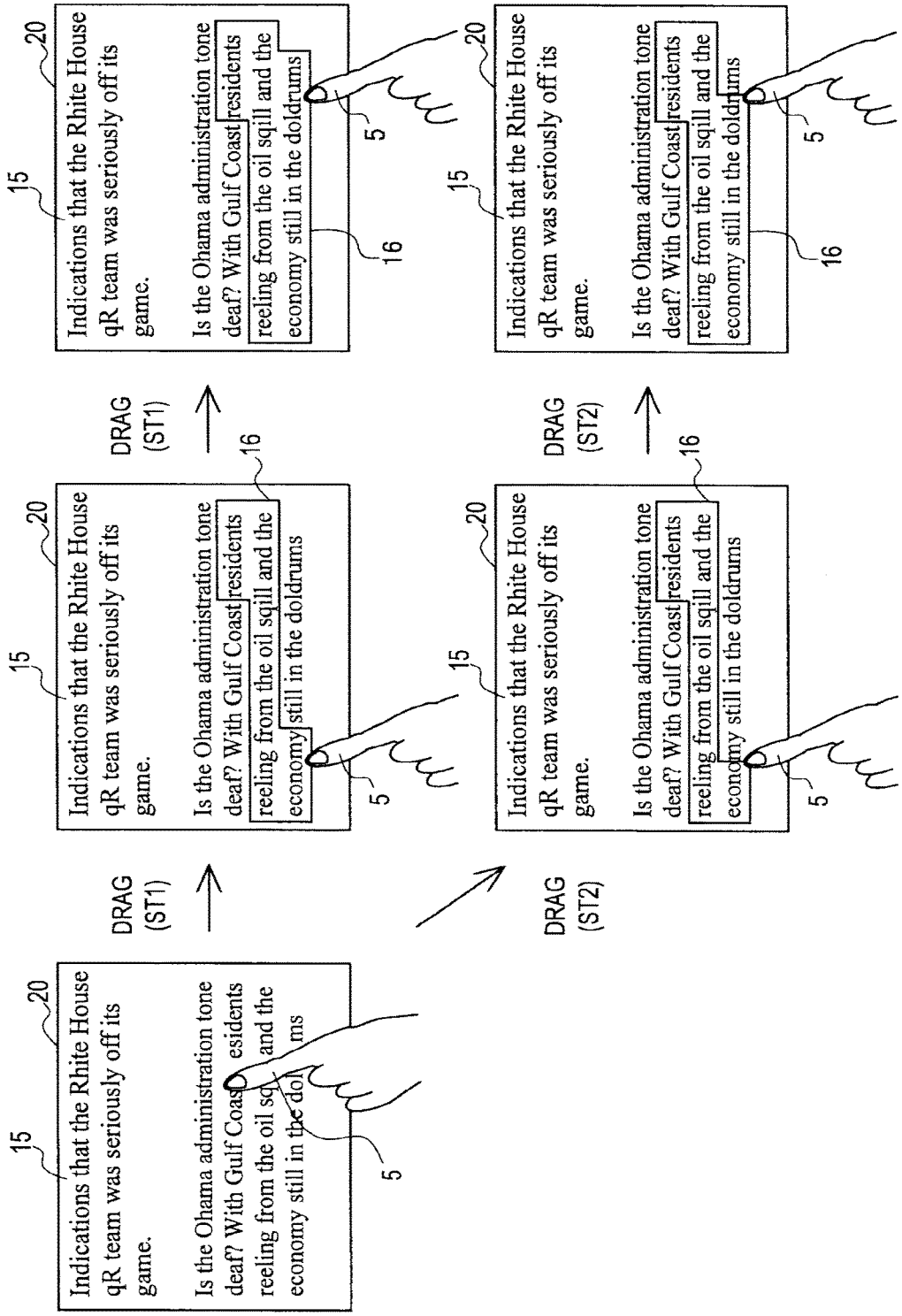
FIG. 10 is an explanatory diagram illustrating a fourth example of GUI according to an embodiment.

The fourth example shown in FIG. 10 is an example of GUI with which a user specifies a parameter of a selection range of text displayed on the touch screen 20. The limitation of the GUI in the fourth example is a limitation for setting a selection range of text not in units of characters but in units of words.

In the left of FIG. 10, a text 15 is displayed on the touch screen 20. The user drags any position of the text 15, whereby a range corresponding to the dragged position can be selected. However, the selection range is set in units of words in the input state ST1. On the other hand, in the input state ST2, the selection range is set in units of characters, i.e., the minimum unit.

As shown in the center and the right in the upper row of FIG. 10, the user drags the text 15 in the input state ST1, whereby the selection range 16 is set in units of words. On the other hand, as shown in the center and the right in the lower row of FIG. 10, the user drags the text 15 in the input state ST2, whereby the selection range 16 is set in units of characters.

(5) Fifth Example

Figure 11:
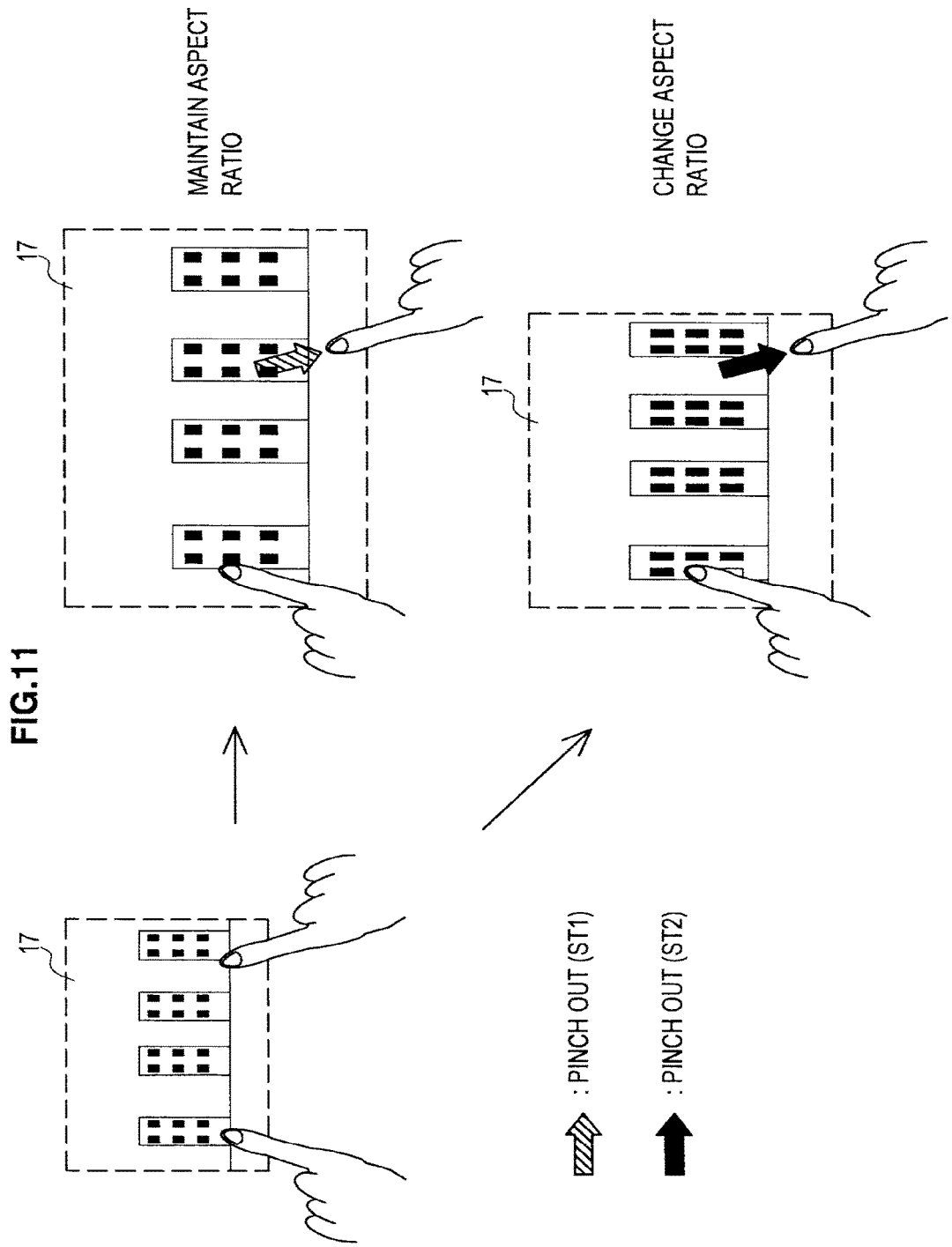
FIG. 11 is an explanatory diagram illustrating a fifth example of GUI according to an embodiment.

The fifth example shown in FIG. 11 is an example of GUI with which a user specifies a parameter of a size of an object displayed on the touch screen 20. The limitation of the GUI in the fifth example is a limitation for maintaining an aspect ratio when a size of an object is changed.

In the left of FIG. 11, an object 17 is shown that may be displayed on the touch screen 20. For example, the user pinches out or pinches in two fingers on the object 17 (in other words, while one of the two fingers is fixed on the object 17, the other of the two fingers is dragged thereon), whereby the size of the object 17 can be enlarged or reduced. However, in the input state ST1, the aspect ratio of the object 17 is maintained. On the other hand, in the input state ST2, the aspect ratio of the object 17 is not maintained, and the shape of the object 17 can be changed in accordance with an enlargement ratio in a vertical direction and an enlargement ratio in a horizontal direction which are different from each other.

As shown in the upper right of FIG. 11, the user pinches out the fingers on the object 17 in the input state ST1, whereby the object 17 is enlarged while the aspect ratio is maintained. On the other hand, as shown in the lower right of FIG. 11, the user pinches out the fingers on the object 17 in the input state ST2 in the same manner, whereby the object 17 is enlarged in the vertical direction.

For example, the pressure compared with the threshold value in the fifth example may be higher one of pressures respectively applied by two fingers, or may be a mean value of pressures applied by two fingers.

(6) Sixth Example

Figure 12:
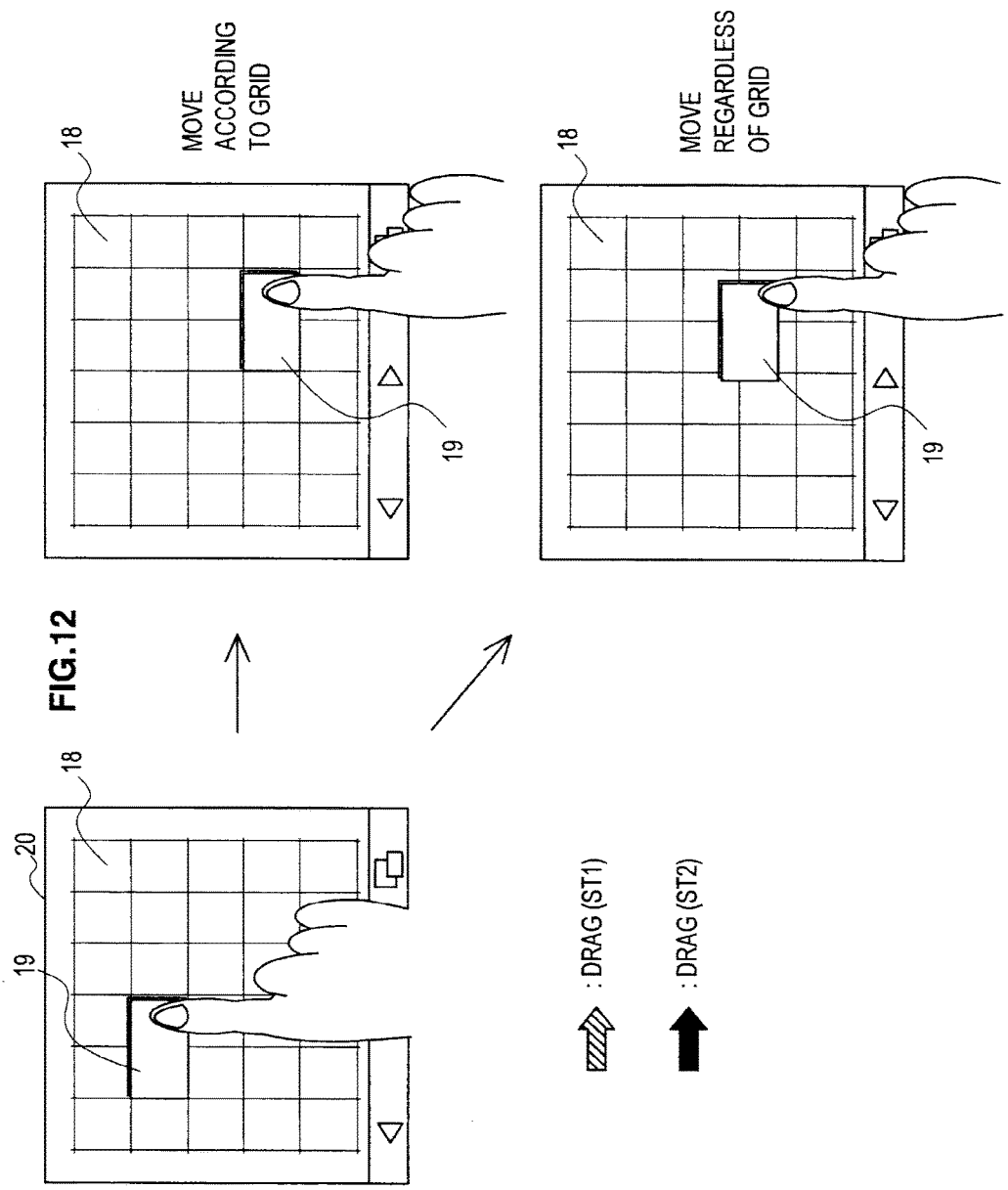
FIG. 12 is an explanatory diagram illustrating a sixth example of GUI according to an embodiment.

The sixth example shown in FIG. 12 is an example of GUI with which a user specifies a parameter of a position of an object displayed on the touch screen 20. The limitation of the GUI in the sixth example is a limitation for aligning a position of an object with a grid.

In the left of FIG. 12, a grid 18 and an object 19 are displayed on the touch screen 20. For example, the user drags the object 19, so that the object 19 can be moved. However, in the input state ST1, the position of the object 19 is arranged at a limited position defined by the grid 18. On the other hand, in the input state ST2, the position of the object 19 is not limited to the position defined by the grid 18.

As shown in the upper right of FIG. 12, the user drags the object 19 in the input state ST1, whereby the object 19 is aligned with the position defined by the grid 18. On the other hand, as shown in the lower right of FIG. 12, the user drags the object 19 in the input state ST2 in the same manner, whereby the object 19 is moved to the specified position without relying on the grid 18.

In the example of GUI described with reference to FIGS. 7 to 12, limitation is enabled/disabled with operation with user interface on the touch screen 20. Therefore, user input for enabling/disabling a limitation is preferably performed during a series of operations performed on the touch screen 20 without interfering with main operation with user interface. In the present embodiment, limitation is enabled or disabled in accordance with input state switched on the basis of pressure applied by user input performed on the touch screen 20. In this case, change of pressure does not interfere with operation performed on the touch screen 20, such as touch, drag, and pinch-in/pinch-out. Further, it is easy for a user to change the pressure during the above operation. Therefore, as described in the present embodiment, enabling/disabling of limitation of GUI is controlled in accordance with the pressure applied by user input, whereby the state of limitation can be switched easily and quickly without losing the intuitive operationality unique to the touch screen.

Many of the examples of limitations explained above are limitation of granularity (the magnitude of the minimum unit of a value that can be specified) of a parameter value that can be specified. In other words, when limitation is enabled, the granularity of the parameter value that can be specified is coarse, in which case even when user input is rough, an appropriate parameter value can be selected. On the other hand, when the limitation is disabled, the granularity of the parameter value that can be specified is fine, in which case the user can finely adjust the parameter value by himself/herself. Further, according to the present embodiment, the user can intuitively switch the setting of granularity of such parameter value by changing the strength of touch operation while the user operates the user interface.

4. EXAMPLES OF DISPLAY OF INPUT STATE

In the present embodiment, the state of user input (the state of setting of limitation) determined by the determination unit 130 is displayed on the touch screen 20 by the display unit 120 under the control of the operation control unit 140. For example, the display unit 120 may change the color or the shape of user interface of a manipulation target, or may attach a certain character string or mark to the user interface of the manipulation target, whereby the state of user input can be displayed. For example, the display unit 120 may display the state of user input using a dedicated indicator provided independently from the user interface of the manipulation target. FIGS. 13 to 16 are explanatory diagrams illustrating examples of displays of the states of user inputs.

Figure 13:
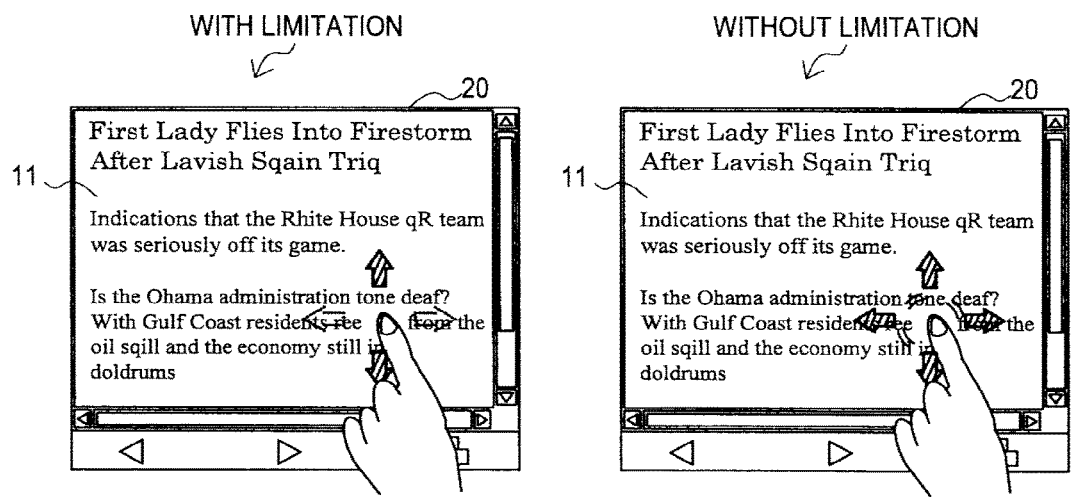
FIG. 13 is an explanatory diagram illustrating a first example of displays of input states according to an embodiment.

FIG. 13 also shows the scrollable Web page 11 shown in FIG. 7 as an example. In FIG. 13, four arrows in up, down, right, and left directions are displayed in proximity to a touched position of the Web page 11. In the state in which the scroll direction is limited to only the vertical direction, the display unit 120 grays out, for example, the arrows in the left and right directions among these arrows. On the other hand, in the state in which the scroll direction is not limited, the display unit 120 displays these four arrows in the same color with the same degree of transparency.

Figure 14:
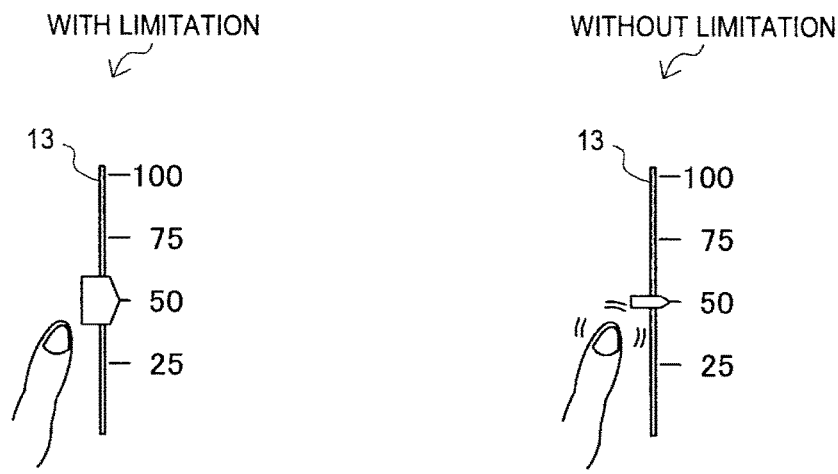
FIG. 14 is an explanatory diagram illustrating a second example of displays of input states according to an embodiment.

FIG. 14 also shows the slider 13 shown in FIG. 8 as an example. For example, the display unit 120 enlarges and displays the knob of the slider 13 (see the left of FIG. 14), in the state in which limitation is imposed on the granularity of the zoom ratio that can be specified. On the other hand, for example, the display unit 120 reduces and displays the knob of the slider 13 (see the right of FIG. 14), in the state in which limitation is not imposed on the granularity of the zoom ratio that can be specified.

Figure 15:
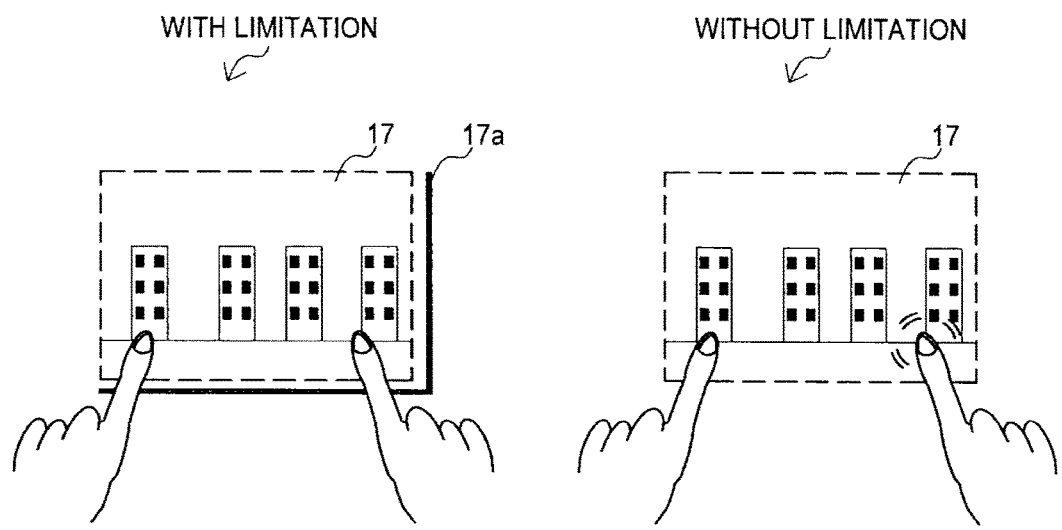
FIG. 15 is an explanatory diagram illustrating a third example of displays of input states according to an embodiment.

FIG. 15 also shows the object 17 whose size can be changed as shown in FIG. 11 as an example. For example, the display unit 120 displays an auxiliary object 17a extending along sides outside of the right side and the lower side of the object 17 (see the left of FIG. 15), in the state in which the aspect ratio of the size to be changed is maintained (i.e., the limitation is enabled). On the other hand, for example, the display unit 120 does not display the auxiliary object 17a (see the left of FIG. 15), in the state in which the aspect ratio of the size to be changed is not maintained.

Figure 16:
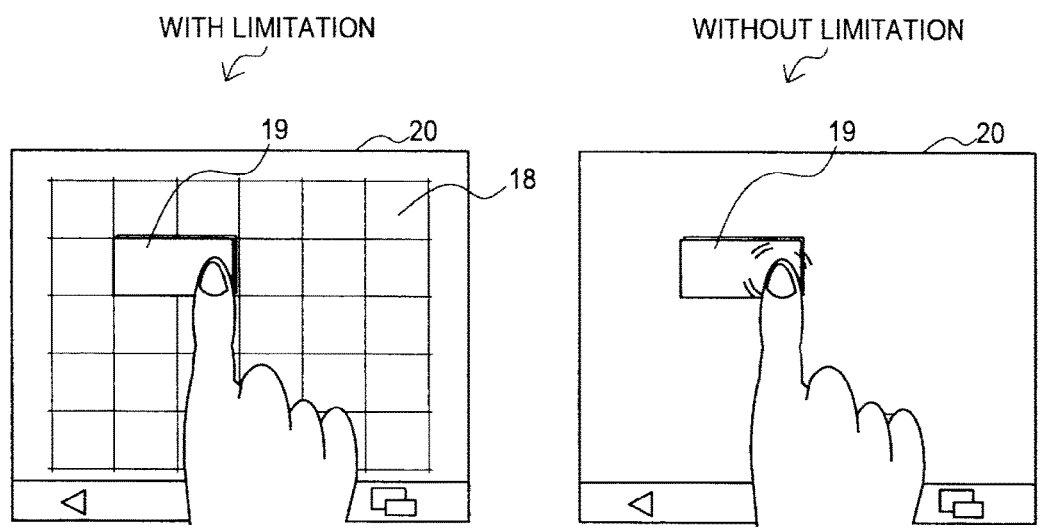
FIG. 16 is an explanatory diagram illustrating a fourth example of displays of input states according to an embodiment.

FIG. 16 also shows the movable object 19 shown in FIG. 12 as an example. For example, the display unit 120 displays the grid 18 (see the left of FIG. 16), in the state in which the position of the object 19 is aligned with the grid (i.e., limitation is enabled). On the other hand, for example, the display unit 120 does not display the grid 18 (see the left of FIG. 16), in the state in which the object 19 can be moved to any position.

As described above, the display unit 120 displays the state of user input on the touch screen 20, so that the user can easily understand whether limitation imposed on operation with user interface is currently enabled or not. Therefore, the user can appropriately switch the state of limitation by changing the pressure.

5. EXAMPLES OF FLOW OF PROCESSINGS

Figure 17:
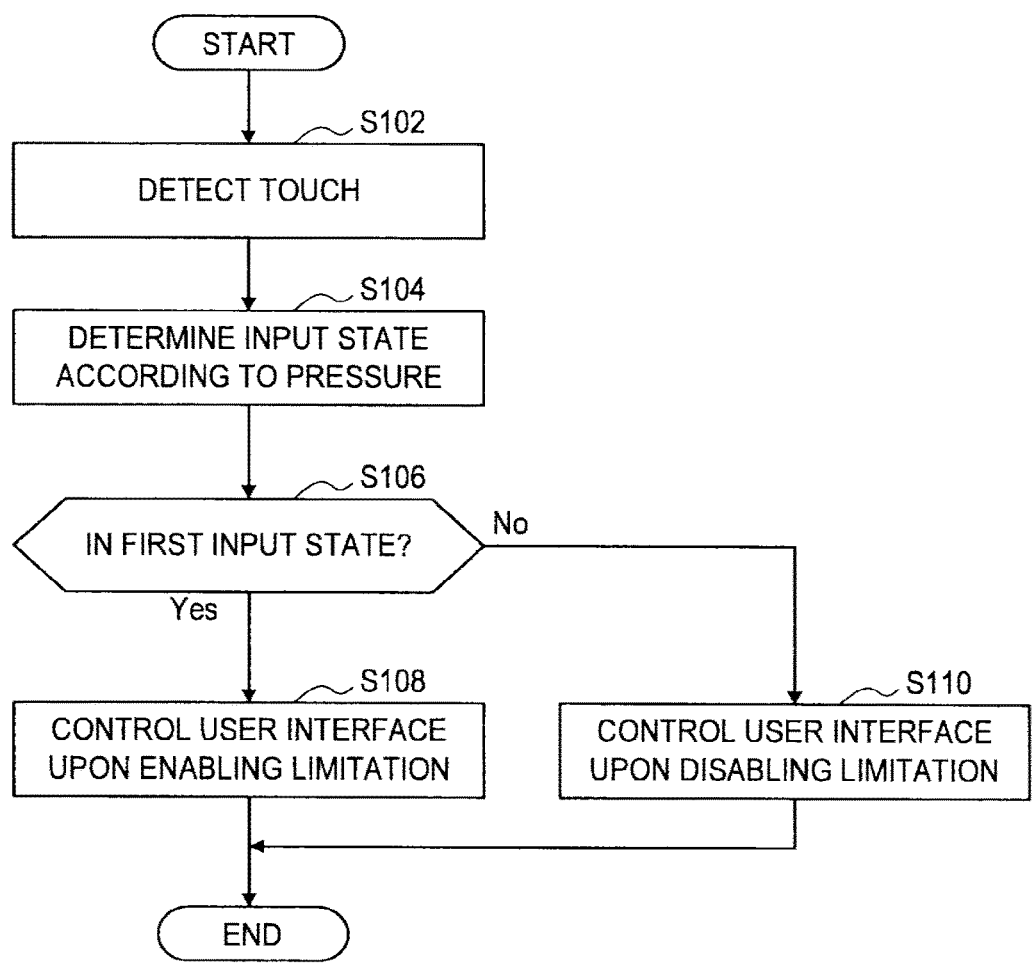
FIG. 17 is a flowchart illustrating an example of flow of operation control processing according to an embodiment.

FIG. 17 is a flowchart illustrating an example of flow of operation control processing performed by the information processing apparatus 100 according to the present embodiment.

As shown in FIG. 17, first, the touch detection unit 110 detects touch operation, i.e., user input, performed on the touch screen (step S102). Then, the touch detection unit 110 outputs information including the pressure and touched position thus detected to the determination unit 130 and the operation control unit 140.

Subsequently, the determination unit 130 determines which of two or more input states the user input belongs to, in accordance with pressure detected by the detection unit 110 (step S104). For example, the determination unit 130 compares the latest pressure value with the threshold value set in advance, thereby determining which of input states ST1 and ST2 a user input belongs to. For example, the determination unit 130 may lock the input state or may release the lock of the input state in accordance with change of the pressure.

Subsequently, the operation control processing is branched in accordance with the current input state (step S106). For example, when the input state is currently the input state ST1, the operation control unit 140 enables the limitation and controls the user interface (step S108). On the other hand, when the current input state is the input state ST2, the operation control unit 140 disables the limitation and controls the user interface (step S110).

Naturally, it should be understood that the present embodiment is not limited to the example of FIG. 17. Alternatively, the limitation may be enabled when the current input state is the input state ST2. Still alternatively, the operation control processing may be branched into processings for three or more input states.

6. CONCLUSION

The embodiment of the present disclosure has been hereinabove explained with reference to FIGS. 1 to 17. According to the present embodiment, determination is made as to which of two or more input states a user input belongs to, in accordance with pressure applied by user input performed on a touch screen. Accordingly, limitation imposed on operation with user interface is enabled or disabled in accordance with the determined input state. Therefore, a user can easily change, on the touch screen, the setting of limitation imposed on operation with user interface.

Further, according to the present embodiment, the input state is determined on the basis of the comparison between the pressure value and the threshold value. Accordingly, without disturbing main operation, the user can switch the state of limitation easily and quickly by increasing (or decreasing) the strength of the pressure during the main operation on which limitation is to be imposed. Further, since a user can change pressure during main operation, it is easy for the user to be reminded of the operation for switching the limitation by comparing it with other kinds of operations even when the user does not remember the operation for switching the limitation.

Further, according to the present embodiment, the state of user input is displayed on the touch screen. Therefore, the user can easily understand whether limitation imposed on operation with user interface is currently enabled or not.

The user interface to which the present embodiment may be applied includes graphical user interface with which a user specifies parameters (such as numerical values, positions, sizes, directions, and ranges). In general, limitations are imposed on parameters in advance when the parameters are specified, and this eliminates the necessity of fine adjustment made by a user and increases the convenience of the application in many cases. However, in some cases, a user himself/herself may want to make fine adjustment. Even in such a case, according to the method of the present embodiment, the user can easily change the state of limitation of operation for specifying a parameter without losing the advantage of the touch screen, i.e., intuitive operationality.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2010-185072 filed in the Japan Patent Office on Aug. 20, 2010, the entire content of which is hereby incorporated by reference.

What is claimed is:

1. An electronic device comprising:
    a touch screen;
    a pressure sensitive sensor configured to detect pressure applied by a first user input of a manipulation object performed on the touch screen; and
    circuitry configured to
        determine which of two or more input states the first user input belongs to by comparing the detected pressure with a threshold value;
        determine that a second user input performed after the first user input belongs to a first input state when the detected pressure is determined to be equal to or less than the threshold value; and
        determine that a third user input performed after the first user input belongs to a second input state when the detected pressure is determined to be more than the threshold value, wherein
        a number of candidate selectable items that are user-selectable in the first input state is less than a number of candidate selectable items that are user-selectable while in the second input state.

2. The information processing apparatus of claim 1, wherein
    the circuitry configured to enable a limitation in the first input state.

3. The electronic device of claim 1, wherein
    the information processing apparatus is one of a personal computer, a smart phone, a music player, a game terminal or a digital household appliance.

4. The electronic device of claim 1, wherein
    the circuitry is configured to control the display to display a screen corresponding to at least one of a web browser, a digital album, a document editor, an email client, a content player or a game application.

5. A method performed by an electronic device including a touch screen and a pressure sensitive sensor configured to detect pressure applied by user input of a manipulation object performed on the touch screen, the method comprising:
    determining which of two or more input states a first user input belongs to by comparing the detected pressure with a threshold value;
    determining that a second user input performed after the first user input belongs to a first input state when the detected pressure is determined to be equal to or less than the threshold value; and
    determining that a third user input performed after the first user input belongs to a second input state when the detected pressure is determined to be more than the threshold value, wherein
    a number of candidate selectable items that are user-selectable in the first input state is less than a number of candidate selectable items that are user-selectable while in the second input state.

6. The method of claim 5, further comprising:
    enabling a limitation in the first input state.

7. The method of claim 5, wherein
    the information processing apparatus is one of a personal computer, a smart phone, a music player, a game terminal or a digital household appliance.

8. A non-transitory computer-readable medium including computer-program instructions, which when executed by an electronic device including a touch screen and a pressure sensitive sensor configured to detect pressure applied by user input of a manipulation object performed on the touch screen, cause the electronic device to:
    determine which of two or more input states a first user input belongs to by comparing the detected pressure with a threshold value;
    determine that a second user input performed after the first user input belongs to a first input state when the detected pressure is determined to be equal to or less than the threshold value; and
    determine that a third user input performed after the first user input belongs to a second input state when the detected pressure is determined to be more than the threshold value, wherein
    a number of candidate selectable items that are user-selectable in the first input state is less than a number of candidate selectable items that are user-selectable while in the second input state.

9. The non-transitory computer-readable medium of claim 8, wherein the computer-program instruction, which when executed by the electronic device, causes the electronic device to:
enable a limitation in the first input state.

10. The non-transitory computer-readable medium of claim 8, wherein
the information processing apparatus is one of a personal computer, a smart phone, a music player, a game terminal or a digital household appliance.

11. The non-transitory computer-readable medium of claim 8, wherein the computer-program instruction, which when executed by the electronic device, causes the electronic device to:
control the display to display a screen corresponding to at least one of a web browser, a digital album, a document editor, an email client, a content player or a game application.

12. The electronic device of claim 1, wherein the circuitry is configured to determine a subsequent user input is performed in response to a pressure decrease after the third user input is determined to be in the second input state.

13. The electronic device of claim 12, wherein the subsequent user input includes a dragging operation.

14. The electronic device of claim 1, wherein the circuitry causes a different GUI to be displayed when in the second input state than when in the first input state.

15. The electronic device of claim 14: wherein the GUI includes a slider and a knob of the slider is displayed larger in the first input state than in the second input state.

16. The electronic device of claim 1, wherein the number of candidate items in the first input state is at least two.

17. The electronic device of claim 2, wherein the circuitry is configured to disable the limitation in the second input state.

18. The electronic device of claim 1, wherein at least one candidate selectable items is a parameter setting.

19. The electronic device of claim 18, wherein the circuitry is configured to control an operation of the information processing apparatus based on the parameter setting.

20. The electronic device of claim 19, wherein the operation is a zoom operation and the parameter setting is a zoom ratio.

* * * * *